(12) United States Patent
Sharma

(10) Patent No.: US 6,425,020 B1
(45) Date of Patent: Jul. 23, 2002

(54) SYSTEMS AND METHODS FOR PASSIVELY TRANSFERRING DATA ACROSS A SELECTED SINGLE BUS LINE INDEPENDENT OF A CONTROL CIRCUITRY

(75) Inventor: Sudhir Sharma, Plano, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 08/843,569

(22) Filed: Apr. 18, 1997

(51) Int. Cl.[7] .............................................. G06F 13/14
(52) U.S. Cl. .............................. 710/20; 710/4; 710/129
(58) Field of Search .................................. 395/290, 299, 395/308, 309–311, 741, 823–830, 840–842, 848, 849, 856; 710/3–10, 20–22, 28, 29, 36, 110, 119, 128–131, 268

(56) References Cited

U.S. PATENT DOCUMENTS

| | | | | |
|---|---|---|---|---|
| 5,113,513 A | * | 5/1992 | Kawai ........................ 711/168 |
| 5,404,463 A | * | 4/1995 | McGarvey ................... 395/308 |
| 5,584,039 A | * | 12/1996 | Johnson et al. ............. 395/826 |
| 5,655,151 A | * | 8/1997 | Bowes et al. ............... 395/842 |
| 5,666,521 A | * | 9/1997 | Marisetty ..................... 395/525 |
| 5,687,393 A | * | 11/1997 | Brown et al. ............... 395/849 |
| 5,754,807 A | * | 5/1998 | Lambrecht et al. ......... 395/308 |
| 5,890,012 A | * | 3/1999 | Poisner ........................ 710/22 |

FOREIGN PATENT DOCUMENTS

JP         401134654 A   *   5/1989

* cited by examiner

Primary Examiner—Thomas Lee
Assistant Examiner—Thuan Du
(74) Attorney, Agent, or Firm—James J. Murphy; Winstead SEchrest & Minick

(57) ABSTRACT

Processing circuiter 100 is provided having a passive data transfer capability. Processing circuitry 100 includes a bus 116, a first subsystem 105 coupled to bus 116 through first passive transfer logic 120a, and a second subsystem 108 coupled to bus 116 through second passive transfer logic 120b. Processing circuitry 100 further includes control circuitry 101/103 coupled to bus 116 for initiating a passive data transfer between first and second subsystems 105 and 108, first and second passive transfer logic 120a and 120b there after controlling exchange of data between the first and second subsystems 105 and 108 independent of the control circuitry 101/103.

19 Claims, 3 Drawing Sheets

SYSTEMS AND METHODS FOR PASSIVELY TRANSFERRING DATA ACROSS A SELECTED SINGLE BUS LINE INDEPENDENT OF A CONTROL CIRCUITRY

TECHNICAL FIELD OF THE INVENTION

The present invention relates in general to information processing systems and in particular to passive data transfer circuits, systems and methods.

BACKGROUND OF THE INVENTION

Often times in computing environments, data must be transferred from one memory location to another. These transfers can either be between separate memory subsystems (devices) across an external data bus or internally within the same memory subsystem (device). Transfers between separate memory subsystems occur for example when data are transferred from the system memory to the frame buffer during display data update. A typical example when transfers are performed within the same memory subsystem is during the movement of bit-mapped display data between locations within the frame buffer to effectuate the movement of a "window" of data on the display screen.

A common method of transferring data between subsystems is "bus mastering." In a bus mastering system, a bus controller resides within the core logic and a bus master resides with each subsystem on the bus, for example within the display controller of the display controller-frame buffer subsystem. For discussion, assume that the display subsystem requires data from the system memory. Then, the display controller bus master sends a request to the bus controller for access to the bus and consequently the system memory. The bus controller arbitrates the request with any other requests pending and when able, sends a grant to the requesting bus master, in this case within the display controller. The display controller bus master then controls the bus to the exclusion of all other subsystems, including the CPU.

The full advantages of bus mastering are typically only achieved during the transfers of substantial amounts of data, which are not frequently necessary in the personal computer (PC) environment. Among other things, bus mastering is logic intensive and significantly increases operating overhead. In addition to the logic required to control data flow, the bus master must also include the timing logic necessary to insure that the bus is relinquished before a system crash occurs, since typically even the CPU cannot override the active bus master.

Bit block transfer ("Bit BLT" or simply "BLT") engines are often used when blocks of are transferred from one set of memory locations to another. A bit block transfer can be performed between subsystems, such as between the system memory and the frame buffer, or within a subsystem, such as within the frame buffer. For example, a bit block transfer is commonly used when data is moved from one position on the display screen to another, such as when a window is "dragged" across the screen by a mouse. In this case, the bit block engine (circuitry and software) moves the corresponding bitmapped pixel data in the frame buffer (display memory) from the address space corresponding to the original display position to the address space corresponding to the new display position. Similarly, entire blocks of data may be copied from a set of source locations in memory to a set of destination locations in memory by a block copy.

There are a number of known techniques for implementing bit block transfers (copies). For example, a block of source locations in memory may be identified by the addresses corresponding to a pair of "corners" of the block, the address of one "corner" defining a starting row and a starting column address, and the address of a second corner defining an ending row and an ending column address. Alternatively, a block of storage locations being moved or copied can be defined by a single starting address ("corner") and a block size ("dimensions")from which the ending address can be defined. In either case, once the starting and ending addresses for the source block are defined, the remaining source addresses can be derived therefrom using counters and associated circuitry. Similarly, a block of destination addresses are defined. Data is then transferred between the source and destination blocks by incrementing the source and destination addresses and presenting the appropriate read and write commands.

Bit block transfers also have disadvantages. In particular, bit block transfers are inherently speed-limited. Essentially, during a bit block transfer, data are read from the source block of memory a word or byte at a time and correspondingly written into the destination block of memory a word or byte at a time. This "streaming" of data is time consuming and requires a substantial amount of controller and/or bus bandwidth.

It should also be noted that data transfers between locations within a subsystem or between subsystems can be controlled by the CPU itself. This is typically the case when bus mastering is not used. However, these transfers consume valuable CPU time otherwise available to perform other tasks and are often subject to latency problems. For example, two cycles are required, a first for reading the data from the source location and a second for writing data into the destination location.

Thus, the need has arisen for new circuits, systems and methods for performing data transfers. Such circuits, systems and methods should apply to either inter- and intra-subsystem transfers and provide speed increases and overhead reductions over the prior art.

SUMMARY OF THE INVENTION

According to a first embodiment of the present invention, processing circuitry is disclosed having passive data transfer capability. The processing circuitry includes a bus, a first subsystem coupled to the bus through first passive transfer logic, and a second subsystem coupled to the bus through second passive transfer logic. Control circuitry is coupled to the bus for initiating a passive data transfer between the first and second subsystems, the first and second passive transfer logic thereafter controlling exchange of data between the first and second subsystems independent of the control circuitry.

According to a second embodiment of the principles of the present invention, a processing system is disclosed which includes a bus, passive transfer circuitry coupled to the bus and control circuitry. The control circuitry is operable during a configuration cycle to configure the passive transfer circuitry to transfer data across the bus during a transfer cycle, the transfer of data during a transfer cycle being performed by the passive transfer circuitry independent of the control circuitry.

The principles of the present invention are also embodied in methods of passively transferring data in information processing systems. According to one such method, passive data transfer capability is provided in a system including a plurality of data processing resources each coupled to a bus through associated passive transfer logic. One of the plurality of resources is selected as the source resource. Configuration information is transmitted on the bus configuring the passive transfer logic associated with the source resource to transfer data from the source resource to a selected destination resource. Data is then transmitted from the source resource via the passive transfer logic associated with the source resource to the passive transfer logic associated with a destination resource via the bus.

According to a second such method, a selected one of a plurality of resources is selected as the destination resource. Configuration information is transmitted on a bus configuring the passive transfer logic associated with the destination resource to exchange data with the bus. Data is then transmitted on the bus for exchange with the destination resource through the passive transfer logic associated with the destination resource.

The principles of the present invention provide substantial advantages over the prior art. Among other things, these principles, as embodied in circuits, systems and methods, provide for either inter- or intra-subsystem transfers of data with increased speed and reduced overhead.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–4 of the drawings, in which like numbers designate like parts. While memory devices embodying the principles of the present invention are useful in a wide number of applications, for purposes of illustration, such memory devices will be described in conjunction with a basic processing system architecture typically employed in personal computers.

Figure 1:
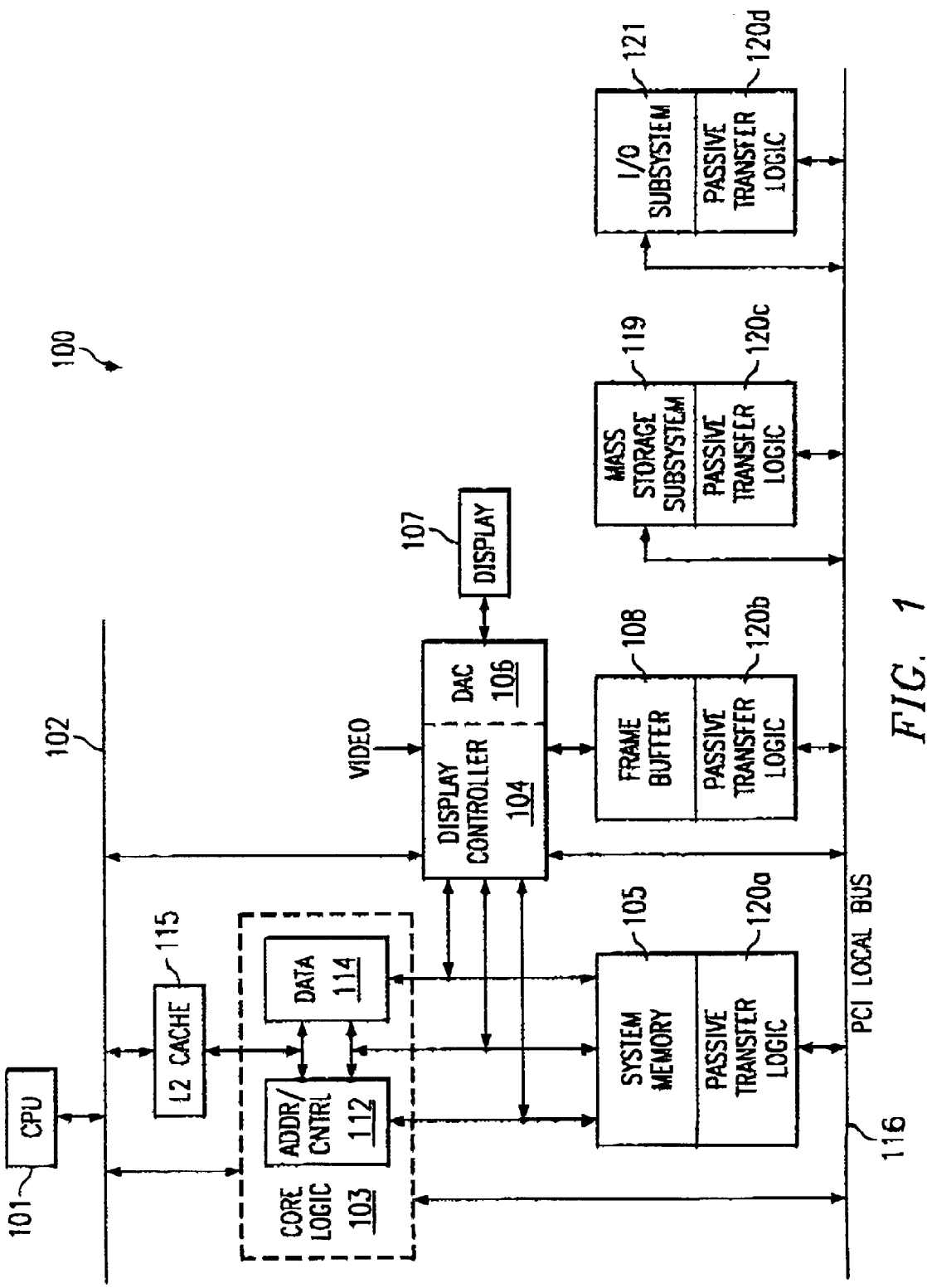
FIG. 1 is a system level block diagram depicting an exemplary information processing system embodying the principles of the present invention.

FIG. 1 is a high level functional block diagram of a portion of a processing system 100 according to the principles of the present invention. System 100 includes a central processing unit 101, a CPU local bus 102, core logic 103, display controller 104, system memory 105, digital to analog converter (DAC) 106, frame buffer 108 and a display device 107.

CPU 101 is the "master" which controls the overall operation of system 100. Among other things, CPU 101 performs various data processing functions and determines the content of the graphics data to be displayed on display unit 107 in response to user commands and/or the execution of application software. CPU 101 may be for example a general purpose microprocessor, such as an Intel Pentium ™ class microprocessor or the like, used in commercial personal computers. CPU 101 communicates with the remainder of system 100 via CPU local bus 102, which may be for example a special bus, or a general bus (common in the industry).

Core logic 103, under the direction of CPU 101, controls the exchange of data, addresses, control signals and instructions between CPU 101, display controller 104, and system memory 105. Core logic 103 may be any one of a number of commercially available core logic chip sets designed for compatibility with the remainder of the system, and in particular with CPU 101. One or more core logic chips, such as chip 112 in the illustrated system, are typically "address and system controller intensive" while one or more core logic chips, such as chip 114 in FIG. 1, are "data intensive." Address intensive core logic chip 112 generally: interfaces CPU 101 with the address path of CPU bus 102; maintains cache memory, including the cache tags, set associative cache tags and other data necessary to insure cache coherency; performs cache "bus snooping"; generates the control signals required for DRAMs in the system memory or cache; and controls general management transactions. Data intensive chip 114 generally: interfaces CPU 101 with the data path of CPU bus 102; issues cycle completion responses to address chip 112 or CPU 101; may abort operations if their cycles are incomplete; and arbitrates for the data path of bus 102.

CPU 101 can directly communicate with core logic 103 or through an external (L2) cache 115. L2 cache 115 may be for example a 256 K Byte fast SRAM device(s). It should be noted that CPU 101 can also include on-board (L1) cache, typically up to 16 kilobytes.

In addition to the conventional functions described above, core logic 103 and/or CPU 101 provide the additional functions described below, either through software programming (such as in the core logic 103) or hardware modification.

Display controller 104 may be any one of a number of commercially available VGA display controllers. For example, display controller 104 may be one of the Cirrus Logic CL-GD754x series of display controllers. The structure and operation of such controllers is described in CL-GD754x Application Book, Rev 1.0, Nov. 22, 1994, and CL-GD7542 LCD VGA Controller Preliminary Data Book, Rev. 1.0.2, June 1994, both available from Cirrus Logic, Inc., Fremont, California, and incorporated herein by reference.

Display controller 104 may receive data, instructions and/or addresses from CPU 101 either through core logic 103 or directly from CPU 101 through CPU local bus 102. Data, instructions, and addresses are exchanged between display controller 104 and system memory 105 through core logic 103. Further, addresses and instructions may be exchanged between core logic 103 and display controller 104 via a local bus 116 which may be for example a PCI local bus. Generally, display controller 104 controls screen refresh, executes a limited number of graphics functions such as line draws, polygon fills, color space conversion, display data interpolation and zooming, and video streaming, and handles other ministerial chores such as power management. Most importantly, display controller 104 controls the raster of pixel data from frame buffer 108 to display unit 107 during screen refresh and interfaces CPU 101 and frame buffer 108 during display data update. Video data may be directly input into display controller 104.

Digital to analog converter 106 receives digital data from controller 104 and outputs the analog data to drive displays 107a and 107b (when used)in response. In the illustrated embodiment, DAC 106 is integrated with display controller 104 onto a single chip, preferably including a RAMDAC and phase locked loop (PLL). Depending on the specific implementation of system 100, DAC 106 may also include a color palette, YUV to RGB format conversion circuitry, and/or X- and Y-zooming circuitry, to name a few options. Displays 107 may be for example a CRT unit, a liquid crystal display, electroluminescent display, plasma display, or other type of display device which displays images on a screen as a plurality of pixels. It should also be noted that in alternate embodiments, "display" 107 may be another type of output device such as a laser printer or similar document view/print appliance.

The data paths in system 100 will vary with each design. For example, system 100 may be a "64-bit" or "72-bit" system. Assume for discussion purposes that a 64-bit system is chosen. Then, each of the data connections, including the data paths of CPU bus 102 and PCI bus 116, the data paths through core logic 103 to system memory 109 and display controller 104, and the data interconnection between display controller 104 and frame buffer 108, are all 64 bits wide. It should be noted that the address interconnections will vary depending on the size of the memory and such factors as the need to support data byte select, error detection correction, and virtual memory operations.

According to the principles of the present invention, at least some of subsystems (resources) of system 100 include passive transfer logic 120. In the illustrated embodiment, system memory 105 is associated with passive logic 120a, frame buffer 104 with passive transfer logic 120b and mass storage subsystem 119 with passive transfer logic 102c. In alternate embodiments, one or more of passive transfer logic blocks may be foregone. Additional peripheral devices and associated passive transfer logic 120 may also be coupled to PCI local bus 116. As an example, an I/O subsystem 121 and associated passive transfer logic 120d are depicted in FIG. 1. I/O subsystem 121 may be, for example, a printer interface, bus interface, local area network interface, or the like.

Passive transfer logic 120 allows one memory device to "passively" exchange data with another memory device without major intervention of the CPU, the controllers, and/or the bus masters, if any. Each passive transfer logic block includes conventional address generators for accessing the associated subsystem and/or generating addresses for transmission on the bus 116 to access other subsystems through their associated passive transfer logic. Also included are registers for storing configuration data (information), command decode logic, and bus interface logic. Advantageously, passive transfer logic 120 allows the controllers, such as display controller 104, and CPU 101 to be freed to perform other required tasks and eliminates the overhead involved when bus mastering is employed.

For discussion purposes, assume that an update of the display data within frame buffer 108 is required. The update may be in initiated by CPU 101 in response to user input, the execution of application or operating system software, or a request from display controller 104. In this case, CPU 101 in conjunction with core logic 103 determines that a passive data transfer will be performed. It should be noted that, notwithstanding passive transfer logic 120, conventional transfers can still be performed by CPU 101, display controller 104 and mass storage subsystem 119 via the PCI bus and the conventional interconnections in the normal fashion.

Figures 2, 3:
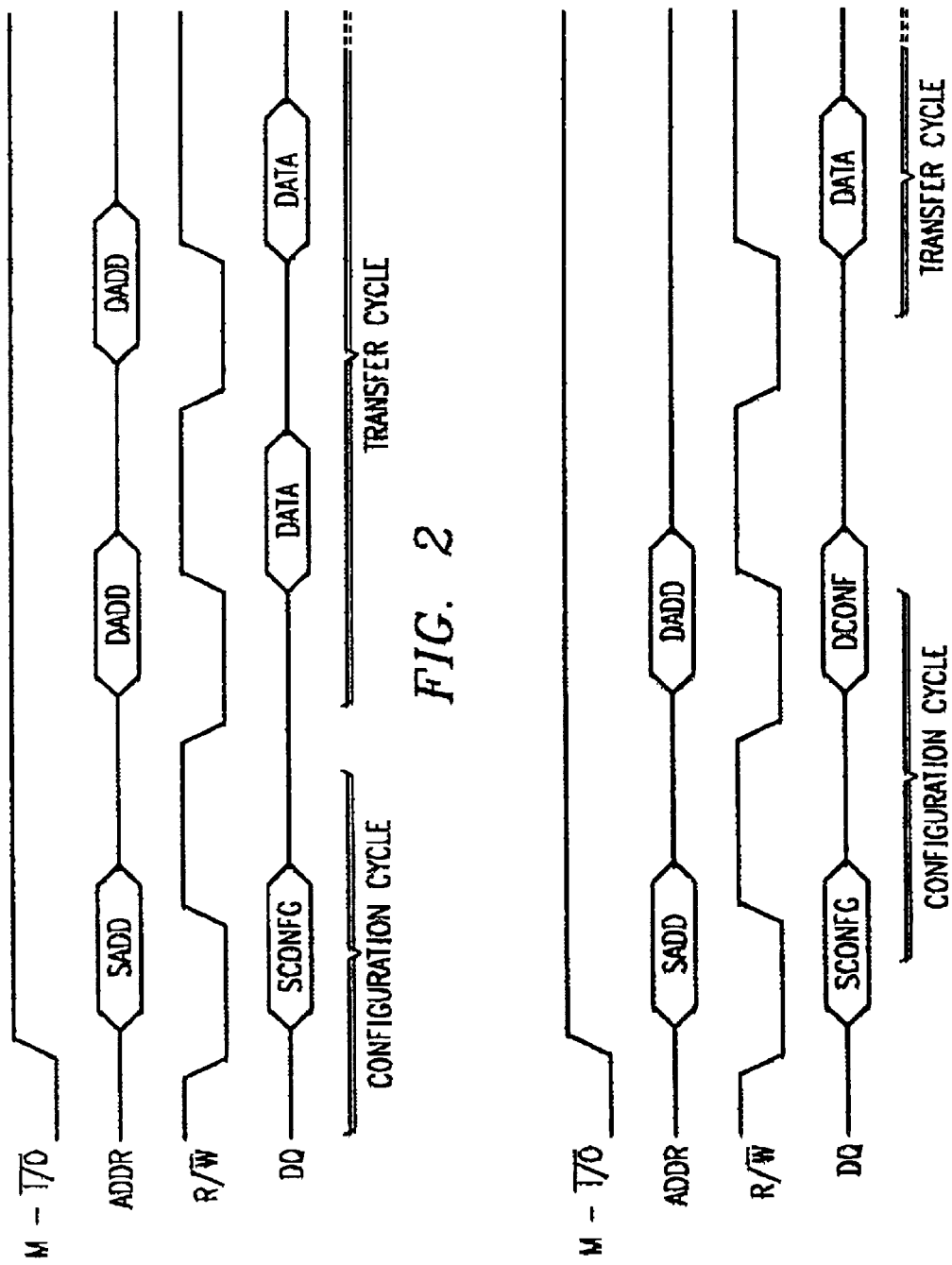
FIG. 2 is a conceptual timing diagram depicting selected cycles during a first method of passively transferring data according to the principles of the present invention.
FIG. 3 is a conceptual timing diagram depicting selected cycles during a second method of passively transferring data according to the princples of the present invention.

A preferred timing of a passive transfer according to the principles of the present invention is illustrated in FIG. 2. CPU 101 initiates the passive transfer by setting the memory—I/O signal high to indicate that it working in the memory space, in which system memory 105 resides (if the source subsystem was an I/O device in the I/O space, this signal would be set low). During the configuration cycle, transfer configuration data CONFG are sent to source passive transfer logic 120 identified by the CPU with a source address SADD, in this example, passive transfer logic 120a associated with system memory 105. Preferably, the source address also defines a starting address to an initial location in system memory 105 for retrieving data. The configuration data then defines the size of the block of data to be retrieved from the source subsystem, the sequencing (incrementation) of the addresses from the starting address to access that block, the type of operation being performed and the destination resource (subsystem).

Passive transfer logic blocks 120 preferably also include address generators for generating addresses for inputting data into the proper locations within the destination device. In this case, the number, starting, ending and sequencing of the destination addresses can also be defined by the transfer configuration data. In this example, the configuration data defines a set of addresses within frame buffer 108 which source transfer logic 120a will generate during the transfer cycle.

A request to relinquish control of PCI bus 116 is transmitted from source transfer logic 120a when configuration is complete. Once core logic 103 grants access to the PCI bus, source transfer logic 120a controls the transfer and intervention by CPU 101 is no longer required. In this example where the transfer is being made to a destination device in the memory space (i.e. frame buffer 108), source transfer logic 120a maintains the memory—I/O signal on PCI bus 116 in a logic high state. Incrementing from the starting address, as defined by the CPU, source logic 120a retrieves data from system memory 105 and presents it on PCI bus 116 along with the corresponding destination address in frame buffer 108. Source transfer logic 120a controls the timing of the transfer by generating and transmitting on PCI bus 116 a read/write (R/W̄) control signal. Preferably, since the sourcing operation is a read, source transfer logic presents data onto bus 116 on the rising edge of the read/write signal. Source transfer logic 120a continues to transmit destination addresses and data, timed by the read/write signal, until the entire address space defined by the configuration data has been accessed.

Destination passive transfer logic 120b latches each word of data received on PCI bus 116 and writes it into the location in frame buffer 108 associated with the concurrently received destination address. The destination operation being a write, data is preferably latched in on the falling edge of the read/write signal. Advantageously, display controller 104 does not have to intervene in the data transfer across PCI bus 116. Display controller 104 can then attend to other tasks, such as screen refresh or DRAM refresh.

In an alternative embodiment, CPU 101 configures the transfer logic 120 at both the source and destination. A preferred timing is shown in FIG. 3. In this case, the source logic 120a is configured to access data from the associated memory or I/O device and present it on the bus as discussed above, with the exception that the source transfer logic does not need to generate or transmit destination addresses. Instead, the CPU 101 transmits during the configuration cycle, a destination address (DADD) and destination configuration data (DCONFG) which identifies the starting and ending addresses (or alternatively, parameters defining the block size) in the destination device, the address sequencing and the type of transfer being performed. Timing is preferably controlled by a read/write signal generated in the source transfer logic 120. Thus, in the example of display data update, source logic 120a simply retrieves data from system memory 105, as defined by the source configuration data, and clocks it across bus 116 with read/write. Destination logic 120b then latches the data in with the read/write signal and writes the data into frame buffer locations generated as defined by the configuration data.

Passive transfers between any pair of devices provided with passive transfer logic 120 can be initiated and performed in a similar fashion. It should be noted that transfers can also be made between any memory or I/O device having a passive transfer logic and CPU 101 and core logic 103 directly. For example, CPU 101 and core logic 103 can write data directly to frame buffer 108 via PCI bus 116. In this case, passive transfer logic 120b is configured by the CPU to write data transmitted on the bus into selected locations in frame buffer 108. CPU 101 and core logic 104 then simply clock data onto PCI bus 116 using the read/write signal without the need to generate individual addresses for each destination location. Again, display controller 104 is advantageously bypassed.

Figure 4:
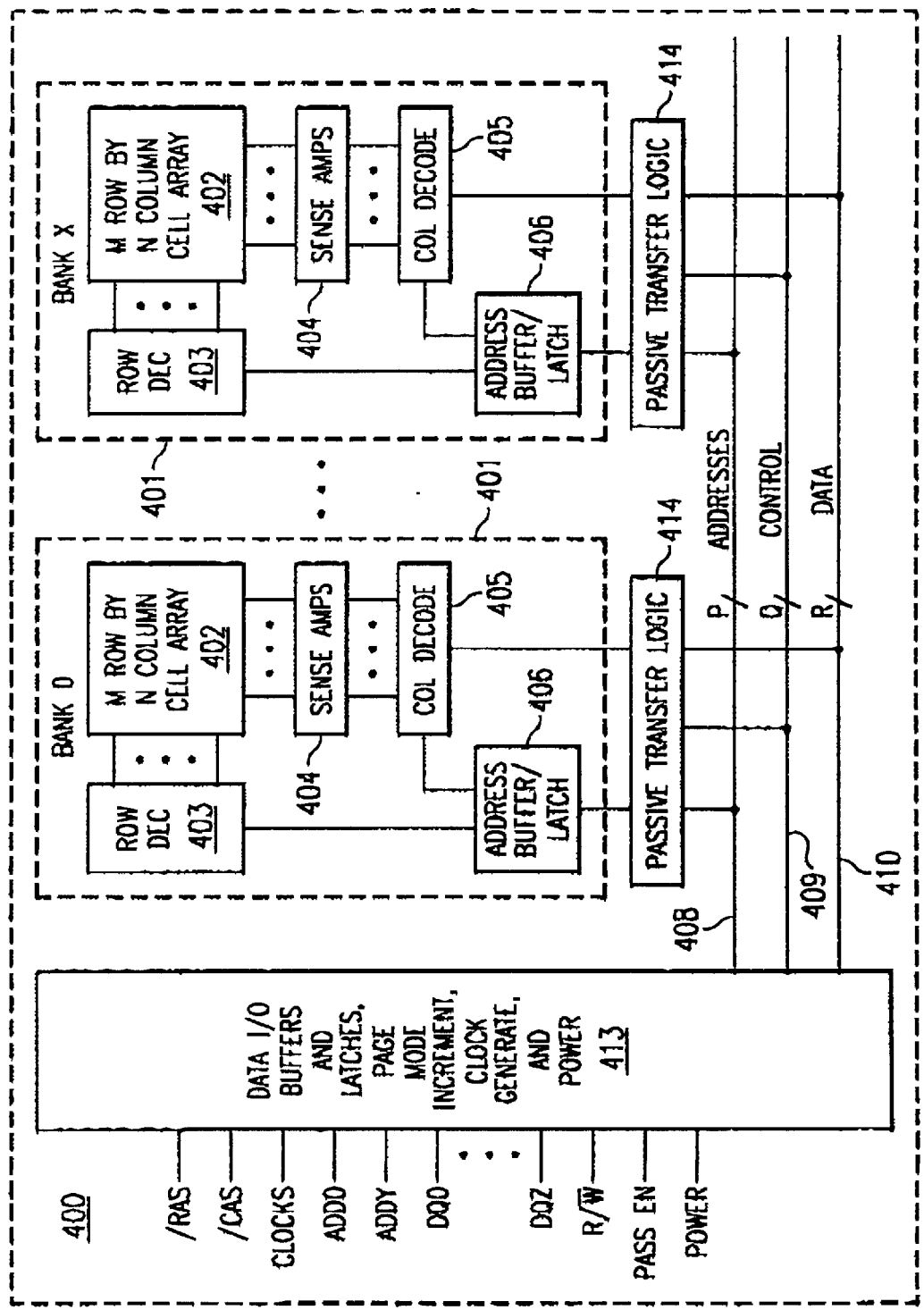
FIG. 4 is a functional block diagram of a memory subsystem embodying the principles of the present invention.

The principles of the present invention can also be applied at the device or chip level. FIG. 4 is a functional block diagram of a multiple bank memory 400 having passive data transfer capability. Preferably, memory 400 is fabricated on a single chip, although this is not a requirement (i.e., the individual banks could each be formed by one or more distinct chips.

In the embodiment illustrated in FIG. 2, system 400 include X number of banks 401, where X is a positive integer greater than or equal to 2. Each bank 401 includes an array 402 of memory cells arranged as M rows and N columns. For example, if each array 402 contained four megabytes (32 megabits), then one possible arrangement would be 4 K rows by 8 K columns. In the preferred embodiment, each array 402 is constructed from dynamic random access memory (DRAM) cells, although an alternate embodiment of other types of data storage devices, such as static random access memory (SRAM) cells or ferroelectric random access memory (FRAM) cells may be used. Each bank 401 further includes conventional row decoder circuitry 403, sense amplifier circuitry 404, and column decode circuitry 405. Row decoder circuitry 403 is coupled to the wordline associated with each of the M rows in cell array 402 and selects one row in response to a row address word received and stored in address buffer/latch 406.

Sense amplifiers 404 are coupled to the bitlines associated with each of the N columns of each array 402. Sense amplifiers 404 sense the data along a selected row using conventional differential sensing techniques. Column decoder 405 selects for access (i.e. read or write) P number of cells along the selected row in response to column address bits received and latched in address buffer/latch 406. For example, if given bank 401 is organized as a ("by 32") device, then P equals 32 and a 32 bit location along the selected row is accessed per column address. Accesses external to memory 400 through column decoder 405 and sense amplifiers 404 is preferably made through a P-bit wide data bus 408. For a more detailed description of basic DRAM structure and operation, reference is now made to Sunaga et al. "DRAM Macros For ASIC Chips," *IEEE Journal of Solid State Circuits*, Volume 30, Number 9, September 1995, incorporated herein by reference.

Input/output circuitry 413 also includes conventional data I/O buffers and latches, page mode increment circuitry for generating column addresses for page mode accesses to the cell array 402 of a selected bank 401, clock generation circuitry and power distribution. In the preferred embodiment, addresses are received at address inputs ADD0 –ADD_Y from a multiplexed address bus in response to a row address strobe (/RAS) and a column address strobe (/CAS). Data is input and output through data pins DQ0–DQ Z in response to a logic low read/write signal (R/$\overline{\text{W}}$) and data is output through dataput/outputs DQ0–DQZ in response to a logic high read/write signal (R/$\overline{\text{W}}$).

Addresses are exchanged between input/output 413 and the address buffers latches 406 or between the banks 401 themselves via the passive transfer logic discussed below across a Q-bit wide address bus 409. An internal control bus 410 carries conventional control signals such as clocks, internal read/write, internal RAS, internal CAS and passive transfer logic enable signals.

According to the principles of the present invention, each bank 401 is associated with passive transfer logic 414. Passive transfer logic 414 operates similar to that described above for the various embodiments of passive transfer logic 120. In this embodiment, buses 408, 409 and 410 act in a fashion similar to that of PCI bus 116 in the system embodiment; during the configuration cycle the address and data buses 408 and 409 transmit source and destination addresses and during the transfer cycle addresses and data respectively. An enable bit PASSIVE ENABLE in the illustrated embodiment allows the controlling processor or controller to define transfer as being passive and therefore that the information received at the address and data inputs to circuitry 413 during the configuration cycle should be interpreted as configuration data defining the transfer itself. Once the passive transfer is initiated, the CPU or controller to initiate a passive transfer within memory 400 and then return to performing other tasks.

Memories, such as memory 400, embodying the principles of the present invention can advantageously be applied in a wide number of processing systems. For example, memories with internal passive data transfer capability can be used to construct frame buffer 108 in system 100. In this case, each memory bank 401 can be used to buffer display data for corresponding area of the display screen. To move a block of display data from one screen position to another, a passive transfer of data between the corresponding memory banks is initiated.

Although the present invention and its advantages have been described in detail, it should be understood that various changes, substitutions and alterations can be made herein without departing from the spirit and scope of the invention as defined by the appended claims.

What is claimed is:

1. Processing circuitry having passive data transfer capability comprising:
   a selected bus;

a first subsystem coupled to said selected bus through first passive transfer logic;

a second subsystem coupled to said selected bus through second passive transfer logic; and control circuitry coupled to said bus for initiating a passive data transfer between said first and second subsystems by transmitting a source address and configuration data via said selected bus to said first passive transfer circuitry during a configuration cycle, said first and second passive transfer logic thereafter controlling exchange of data between said first and second subsystems independent of said control circuitry during a transfer cycle via said selected bus.

2. The processing circuitry of claim 1 wherein at least one of said first and said second subsystems comprises a memory subsystem.

3. The processing circuitry of claim 1 wherein at least one of said first and said second subsystems comprises an input/output subsystem.

4. The processing circuitry of claim 1 wherein said control circuitry comprises a central processing unit.

5. The processing circuitry of claim 1 wherein said control circuitry comprises a controller.

6. The processing circuitry of claim 1 wherein said control circuitry further transmits said configuration data to said second passive transfer logic during said configuration cycle.

7. The processing circuitry of claim 1 wherein said first and second subsystems comprise first and second banks in a multi-bank memory system.

8. The processing circuitry of claim 7 wherein said multi-bank system is fabricated on a single chip.

9. A processing system comprising:

a selected bus;

passive transfer circuitry coupled to said selected bus; and control circuitry operable during a configuration cycle to configure said passive transfer circuitry to transfer data across said selected bus during a transfer cycle, said transfer of data during said transfer cycle performed by said passive transfer circuitry independent of said control circuitry.

10. The processing system of claim 9 wherein said control circuitry is operable during said configuration cycle to:

transmit a source address identifying a source resource associated with said passive transfer logic circuitry; and transmit configuration information configuring said passive transfer logic circuitry to transfer data from said source resource to said bus.

11. The processing system of claim 9 wherein said control circuitry is operable during said configuration cycle to:

transmit a destination address identifying a destination resource associated with said passive transfer logic circuitry; and transmit configuration information configuring said passive transfer logic circuitry to transfer data from said bus to said destination resource.

12. The processing system of claim 9 wherein said bus comprises a PCI local bus.

13. The processing system of claim 9 wherein said passive transfer logic and said bus are disposed on a single integrated circuit chip.

14. A method of transferring data in a system including a plurality of data processing resources each coupled to a bus through associated passive transfer logic, comprising the steps of:

selecting one of the plurality of data processing resources as a source resource;

selecting a second of the plurality of data processing resources as a destination resource;

transmitting configuration information on the bus during a configuration cycle configuring the passive transfer logic associated with the selected source resource to transfer said data from the selected source resource to the selected destination resource; and transmitting said data from the selected source resource during a transfer cycle via the passive transfer logic associated with the selected source resource to the passive transfer logic associated with the selected destination resource via the bus.

15. The method of claim 14 and further comprising the steps of:

generating an address in the passive transfer logic associated with the selected source resource addressing a location within the selected destination resource; and transmitting the address to the passive logic associated with the selected destination resource via the bus.

16. The method of claim 14 and further comprising the steps of:

transmitting second configuration information on said bus configuring the passive transfer logic associated with the destination resource to independently transfer data from the bus to a location within the selected destination resource.

17. A method of transferring data in a system including a plurality of data processing resources each coupled to a bus through associated passive transfer logic, comprising the steps of:

selecting one of the plurality of data processing resources as a destination resource;

during a configuration cycle, transmitting configuration information on the bus configuring the passive transfer logic associated with the destination resource to exchange the data with the bus; and during a transfer cycle, transmitting the data on the bus for exchange with the destination resource through the passive transfer logic associated with the destination resource.

18. The method of claim 17 wherein said step of transmitting the data comprises the step of transmitting the data from one of the plurality of resources selected as a source resource through the passive transfer logic associated with the source resource.

19. The method of claim of claim 17 wherein said step of transmitting the configuration information comprises the step of transmitting configuration information under the control of a central processing unit.

* * * * *